Sept. 9, 1969          B. E. OWEN          3,466,083
PICKUP CAMPER
Filed June 30, 1967          3 Sheets-Sheet 1
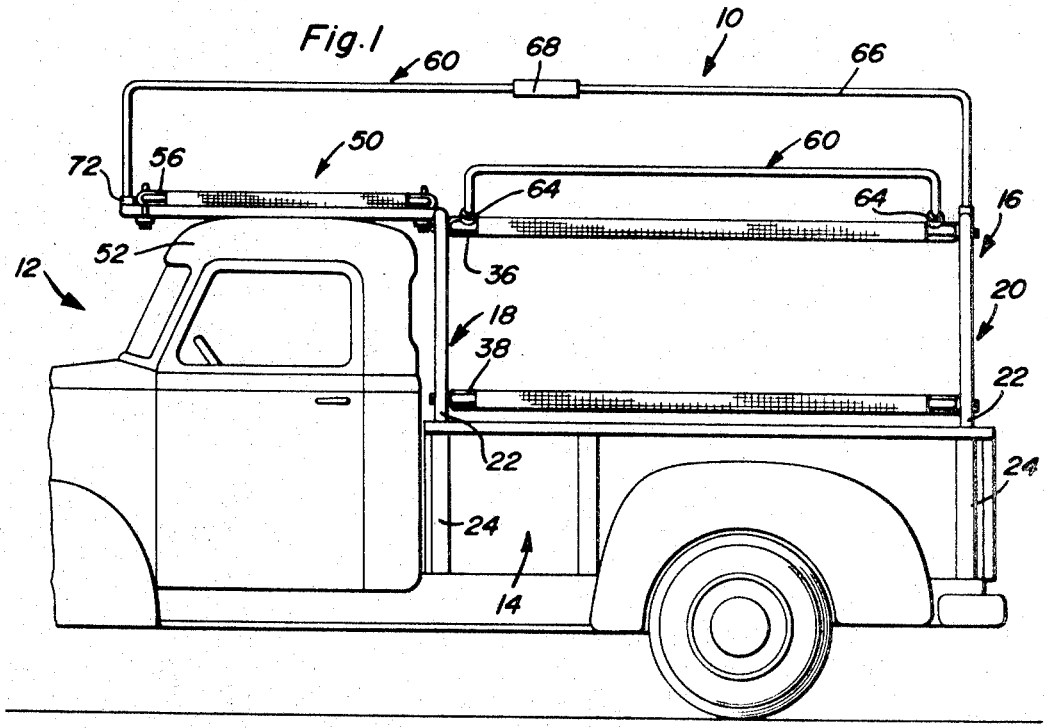
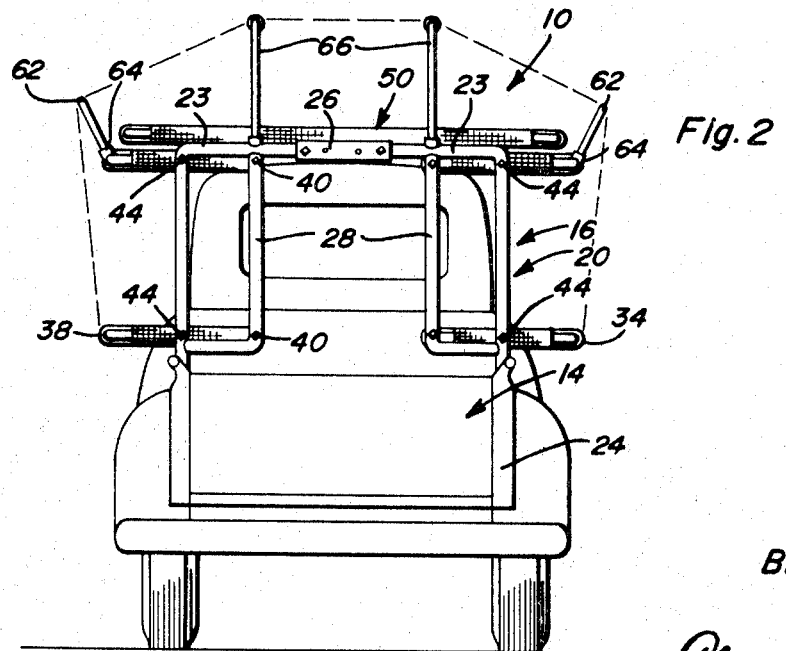
Bill E. Owen
INVENTOR.

Sept. 9, 1969     B. E. OWEN     3,466,083
PICKUP CAMPER
Filed June 30, 1967     3 Sheets-Sheet 2
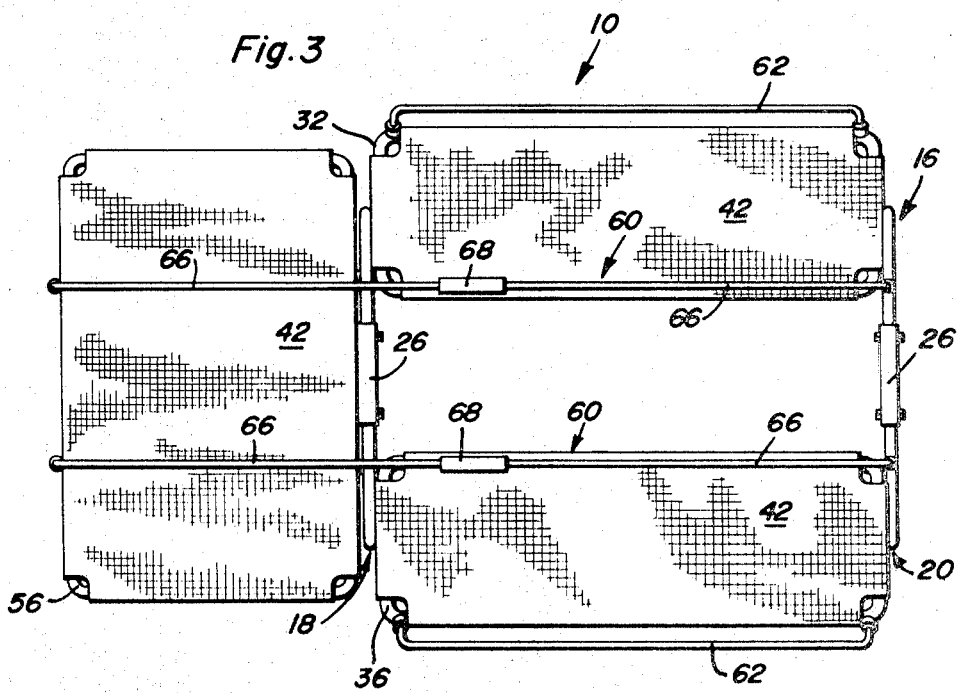
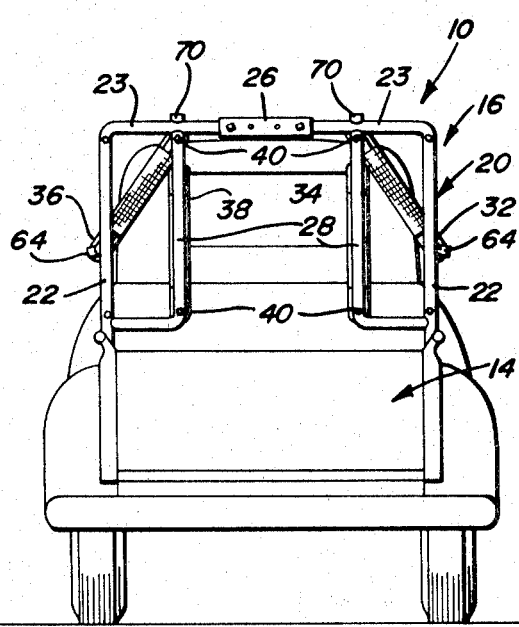
Bill E. Owen
INVENTOR.

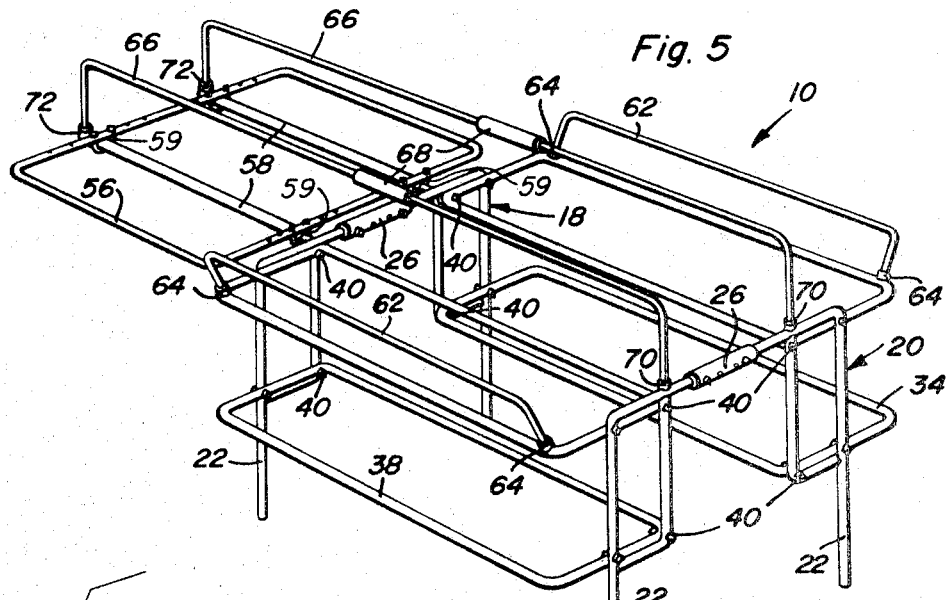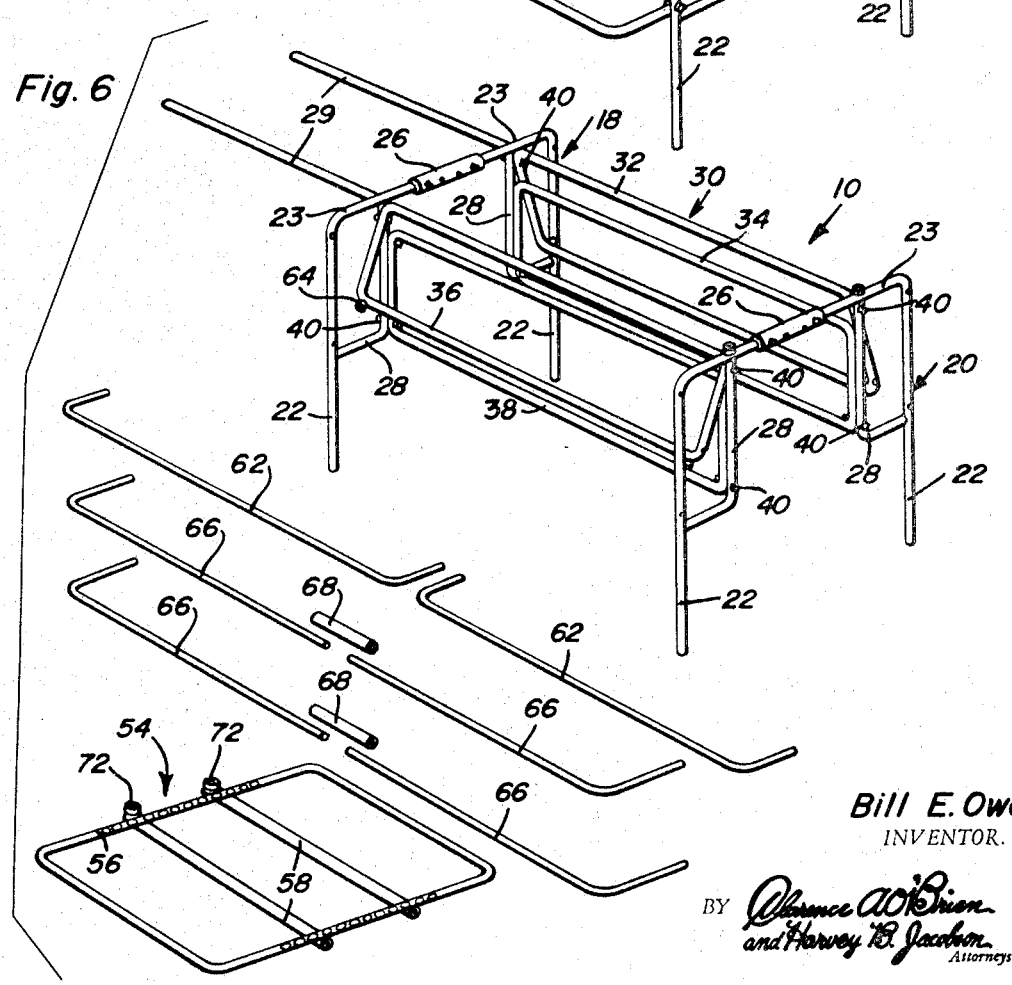

United States Patent Office 3,466,083
Patented Sept. 9, 1969

3,466,083
PICKUP CAMPER
Bill E. Owen, Columbus, Miss.
(Rte. 1, Box 160, Steens, Miss. 39766)
Filed June 30, 1967, Ser. No. 650,360
Int. Cl. B60p *3/34*
U.S. Cl. 296—23           11 Claims

ABSTRACT OF THE DISCLOSURE

A partially collapsible camper frame having end stanchions removably supported in the corner stanchion sockets of a pickup truck body which end stanchions support a plurality of longitudinally and laterally disposed knockdown or collapsible bunks. The camper frame is further provided with knockdown standoff means for supporting a tent covering thereabout in spaced relation from the bunks.

---

This invention relates to a pickup camper and more particularly to a knockdown, collapsible tent and bunk supporting camper frame means.

It is an object of the present invention to provide a novel construction for a camper frame adapted to be operatively positioned on a pickup truck body which camper frame includes a plurality of knockdown and/or collapsible bunks.

Another object of the present invention is to provide a novel construction for a camper frame adapted to be utilized in conjunction with pickup trucks and the like wherein there are provided a plurality of partially collapsible or knockdown bunks adapted to be readily manipulated from a stowed nonuse position, such as during over-the-road travel, to a use position wherein the camper frame provides sleeping accommodations for a plurality of persons.

A further object of the present invention is to provide a novel construction for a pickup camper preferably constructed primarily of tubular stock so as to provide a lightweight rigid camper frame adapted to provide sleeping accommodations for a plurality of persons which frame may be rendered relatively compact during periods of nonuse so as to provide a minimum of load width and wind resistance during periods of over-the-road travel of the truck with which it is associated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of an exemplary embodiment of a camper frame produced in accordance with the present invention and shown operatively positioned in relation to the body of a pickup truck, and further showing a plurality of knockdown and/or collapsible bunks in a use position;

FIG. 2 is a rear elevational view of the pickup camper of FIG. 1, further showing, in phantom lines, the placement of a tent covering over the camper frame;

FIG. 3 is a top plan view of the pickup camper of FIGS. 1 and 2;

FIG. 4 is a rear elevational view somewhat similar to FIG. 2 but showing the web covered bunks in their nonuse position;

FIG. 5 is a perspective view of the camper frame, with the web coverings for the bunks having been removed; and FIG. 6 is a partially exploded view of the camper frame of FIGS. 1–5 showing how the frame is partially knocked down and partially collapsed during over-the-road travel of a pickup truck with which it is associated.

Referring now to the drawings in greater detail and FIGS. 1, 2 and 4 in particular, it will be seen that an exemplary embodiment 10 of a pickup camper constructed in accordance with the principles of the present invention is shown operatively positioned on a pickup truck 12 and more particularly generally within the body 14 thereof. The pickup camper 10 includes a frame means indicated generally at 16 including forwardly and rearwardly disposed transverse stanchions 18 and 20 respectively, each provided with vertically disposed and downwardly projecting portions 22 adapted to be received within the stanchion sockets 24 of the pickup truck body 14 and horizontally disposed portions 23 projecting inwardly and transversely of the truck body 14. The stanchions 18 and 20 are preferably formed of two complementary generally P-shaped portions which in use are connected by adjustable locking sleeves 26 so as to facilitate installation of the pickup camper 10 within the body 14 by a single person if necessary. The stanchions 18 and 20 further include inwardly disposed bunk support brackets or gussets 28 rigidly secured to the vertically and horizontally disposed portions 22 and 23 thereof such as by welding, for example.

A bunk means indicated generally at 30 is interposed and extends between the stanchions 18 and 20 and more particularly the bunk support brackets 28 thereof. Toward this end, a plurality of elongated generally rectangular peripheral bunk frames 32, 34, 36 and 38 are pivotally carried by the bunk support brackets 28 for limited pivotal movement about horizontal axes defined by the pivot bolts 40. The bunks 32–38 are preferably provided with canvas coverings 42 fastened in a suitable conventional manner, not shown. As best seen from a comparison of FIGS. 4 and 2 when the bunks are moved from the nonuse position shown in FIG. 4 to the use position shown in FIG. 2 they are maintained in such use position by bolts or pins 44 which pass through suitable normally aligned apertures provided in the stanchions 18 and 20 and the bunk frames 32–38.

In addition, the pickup camper frame 10 is also preferably provided with a transversely disposed double bunk indicated generally at 50 which in use is positioned above, and somewhat supported by, the cab 52 of the pickup truck 12. Toward this end, the forwardly disposed stanchion 18, and particularly the bunk support brackets 28 thereof, are provided with integral horizontally disposed forwardly projecting extension 29. The bunk 54 includes a peripheral frame 56 and tubular sleeves 58 telescopingly receivable over the extensions 29. The sleeves 58 are removably secured to the frame 56 by suitable fastening means such as U-bolts 59, or the like and the sleeves 58 are removably secured over the extensions 29 by any suitable means such as setscrews, not shown. It will thus be appreciated that during over-the-road travel the forwardly disposed bunk 54 may be removed and stowed within the truck body 14.

Inasmuch as a tent covering, as schematically shown in phantom lines in FIG. 2, is normally utilized to provide a weather cover for the pickup camper 10 when the bunks are in their use position, the pickup camper 10 is further provided with tent support means 60 generally and normally projecting upwardly above the uppermost bunks. The tent support means 60 includes a plurality of elongated U-shaped members 62 adapted to be removably secured to the outer extremities of the bunk frames 32 and 36 such as by suitable socket members 64. The tent support means 60 further includes a pair of elongated tent support members 66, preferably due to their great length, formed of two L-shaped sections joined by locking sleeves 68. The rearwardly disposed members 66 are operatively positioned and removably secured to the rear stanchion 16 by socket members 70 and the forwardly disposed members 66 are removably secured to the end of the tubular members 58 by socket members 72. It will be understood that the locking sleeves 26, 68 and socket members 64, 70 and 72 are provided with threadably received setscrews or the like to facilitate locking the respective tubular members received therewithin. Thus, from a consideration of a partially exploded illustration in FIG. 6 it will be seen that the forwardly disposed bunk 50 and tent support means 60 may be readily removed and stowed within the body 14 during over-the-road travel of the pickup truck so as to render the pickup camper 10 relatively compact and reduce wind resistance caused thereby.

With further regard to the utilization of the pickup camper 10, and again comprising FIGS. 4 and 2 it will be seen that the lowermost bunks 34 and 38 are normally stowed in a vertically disposed position, as seen best in FIG. 4, and the uppermost bunks 32 and 36 are pivoted downwardly in generally overlying relation to the bunks 34 and 38 and the forwardly disposed bunk 50 and tent support means 60 are removed and stowed within the pickup truck body 14. It will thus be understood that FIG. 4 illustrates the configuration of the pickup camper 10 when traveling over the road. By comparison, in FIG. 2, it will be seen that the bunks 32 and 36 have been pivoted upwardly about their respective pivot bolts 40 and secured by their respective lockpins 44, and the bunks 34 and 38 have been pivoted downwardly about the axes provided by their respective pivot bolts 40 and secured by pins 44. The transversely disposed forward bunk 50 has been operatively positioned above the cab 52 of the truck 12 by engaging the tubular members 58 about the support members 29 and the members 66, 68 and 62 comprising the tent support means 60 have been operatively positioned in their respective socket members 64, 70 and 72 and appropriately joined, as required, with the connecting sleeves 68. In order to weatherproof the pickup camper it is then merely necessary to place a suitable tent covering thereabout.

It will also be understood that the adjustable sleeves 26 are preferably provided with an adjustable means of securing the respective stanchion members therein so as to facilitate varying the distance between associated vertical stanchion portions 22 so as to compensate for pickup truck bodies of varying widths.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A camper frame to be mounted on a pickup truck body and the like which comprises a generally upstanding frame means adapted to be removably received generally within a pickup truck body, said frame means including front and rear transverse end stanchion means for removable support adjacent the forward and rear corners of a pickup truck body and support therefrom, said stanchion means including bunk support bracket means integral therewith and disposed inwardly of the remote ends of the transverse end stanchions, and bunk means interposed and extending between said bunk support bracket means and said stanchion means, means pivotally securing said bunk means to said bunk support bracket means and means for selectively securing said pivotally secured bunk means in removably secured relation to said stanchion means at the forward and rear corners of a truck body with which the camper frame is associated, said front stanchion means including an upper portion which extends upwardly to an elevation adapted to project above the cab of the pickup truck, said upper portion being provided with at least a pair of parallel horizontally and forwardly projecting and generally cantilevered bunk support members and forward bunk means removably supported from said cantilevered members so as to provide bunk means generally overlying the cab of a pickup truck with which the camper frame is associated.

2. The combination of claim 1 wherein said camper frame is provided with upstanding tent support means adapted to space a tent covering generally above said bunks, said tent support means comprising at least one longitudinally extending tent support member removably secured to and upstanding from said rear stanchion and the forwardly disposed edge of said forward bunk means.

3. The combination of claim 2 wherein said tent support means includes longitudinally and generally upstanding tent support members removably secured to the outer edge of said longitudinally extending bunk means.

4. A camper frame to be mounted on a pickup truck body and the like which comprises a generally upstanding frame means adapted to be removably received generally within a pickup truck body, said frame means including front and rear transverse end stanchion means for removable support adjacent the forward and rear corners of a pickup truck body and support therefrom, said stanchion means including bunk support bracket means integral therewith and disposed inwardly of the remote ends of the transverse end stanchions, and bunk means interposed and extending between said bunk support bracket means and said stanchion means, means pivotally securing said bunk means to said bunk support bracket means and means for selectively securing said pivotally secured bunk means in removably secured relation to said stanchion means at the forward and rear corners of a truck body with which the camper frame is associated, said end stanchion means each comprising at least two sections and said sections are provided with adjustable connector means extending therebetween to facilitate operatively positioning said stanchion means in pickup truck bodies of varying widths.

5. In combination with a pickup truck and the like a camper frame which comprises a generally upstanding frame means adapted to be removably received generally within the pickup truck body, said frame means including front and rear transverse end stanchion means removably received adjacent the forward and rear corners of the pickup truck body and supported thereby, said stanchion means including bunk support bracket means integral therewith and disposed inwardly of the sides of the truck body, and pivotally secured bunk means interposed and extending between said bunk support bracket means and said stanchion means, means pivotally securing said bunk means to said bunk support bracket means and means for selectively securing said pivotally secured bunk means in removably secured relation to said stanchion means at the forward and rear corners of the truck body with which the camper frame is associated, said front stanchion means including an upper portion which extends upwardly to an elevation at least above the cab of the pickup truck, said upper portion being provided with at least a pair of parallel horizontally and forwardly projecting and generally cantilevered bunk support members and forward bunk means removably supported from said cantilevered members so as to provide bunk means generally overlying the cab of a pickup truck with which the camper frame is associated.

6. The combination of claim 5 wherein said camper frame is provided with upstanding tent support means adapted to space a tent covering generally above said bunks, said tent support means comprising at least one longitudinally extending tent support member removably secured to and upstanding from said rear stanchion means and the forwardly disposed edge of said transverse forward bunk means.

7. The combination of claim 6 wherein said tent support means includes longitudinally and generally upstanding tent support members removably secured to the outer edge of said longitudinally extending bunk means.

8. In combination with a pickup truck and the like a camper frame which comprises a generally upstanding frame means adapted to be removably received generally within the pickup truck body, said frame means including front and rear transverse end stanchion means removably received adjacent the forward and rear corners of the pickup truck body and supported thereby, said stanchion means including bunk support bracket means integral therewith and disposed inwardly of the sides of the truck body, and pivotally secured bunk means interposed and extending between said bunk support bracket means and said stanchion means, means pivotally securing said bunk means to said bunk support bracket means and means for selectively securing said pivotally secured bunk means in removably secured relation to said stanchion means at the forward and rear corners of the truck body with which the camper frame is associated, said end stanchion means each comprising at least two sections and said sections being provided with adjustable connector means extending therebetween to facilitate operatively positioning said stanchion means in pickup truck bodies of varying widths.

9. An elongated camper frame for mounting from the load bed of a pickup truck or the like, said frame including front and rear transverse end stanchion means for ready removable support from the front and rear corners of said load bed, said stanchion means each including right and left uprights whose upper end portions are provided with corresponding oppositely horizontally inwardly directed portions projecting toward each other, elongated right and left bunk means interposed and extending between corresponding right and left uprights, respectively, means pivotally securing said bunk means to said right and left uprights, means operatively connecting the adjacent inner free ends of each pair of corresponding horizontally directed portions for longitudinal adjustment shifting relative to each other, whereby the right and left uprights of each stanchion means and said right and left bunk means may be adjustably positioned toward and away from each other to facilitate positioning said stanchion means in pickup truck load beds of varying widths.

10. The combination of claim 9 wherein said means securing said bunk means to said uprights includes means oscillatably supporting said bunk means from said stanchions for swinging between generally horizontal and upright positions about horizontal axes extending longitudinally of said bunk means and disposed between upstanding planes extending longitudinally of said frame and containing the outermost extremities of corresponding right and left uprights.

11. The combination of claim 9 wherein said front stanchion means includes an upper portion which extends upwardly to an elevation adapted to project above the cab of a pickup truck, said upper portion including said relatively adjustable inwardly directed portions, said inwardly directed portions being provided with generally parallel horizontally forwardly projecting and generally cantilevered bunk support members, forward bunk means, means removably supporting said forward bunk means from said cantilevered bunk support members, said means securing said bunk means to said cantilevered bunk support members including means whereby said bunk means may be secured to said cantilevered support members when the latter are spaced various distances apart.

References Cited

UNITED STATES PATENTS

| | | | |
|---|---|---|---|
| 2,632,667 | 3/1953 | Gray | 296—23.2 |
| 3,009,212 | 11/1961 | Makens | 296—27 |
| 3,297,355 | 1/1967 | Robinson | 296—23 |

PHILIP GOODMAN, Primary Examiner

U.S. Cl. X.R.

135—1